Figure 1:
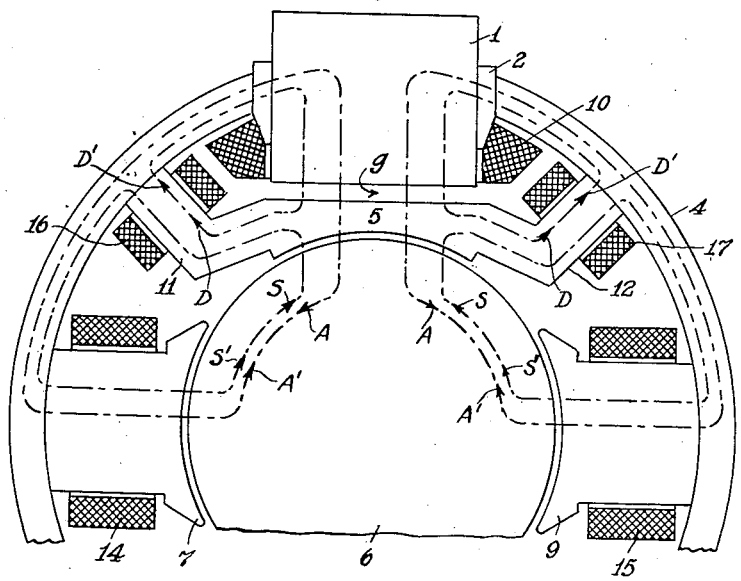

June 20, 1939.　　　E. E. TISZA ET AL　　　2,163,417

DIRECT-CURRENT GENERATOR FOR ARC WELDING

Filed Aug. 25, 1938　　　4 Sheets-Sheet 1

INVENTORS
Ernest E. Tisza & Joseph Tyrner
BY
William, Rich & Thores
ATTORNEYS

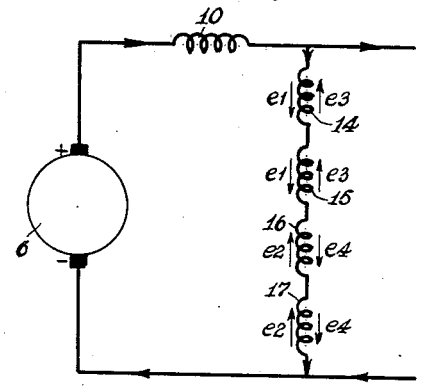
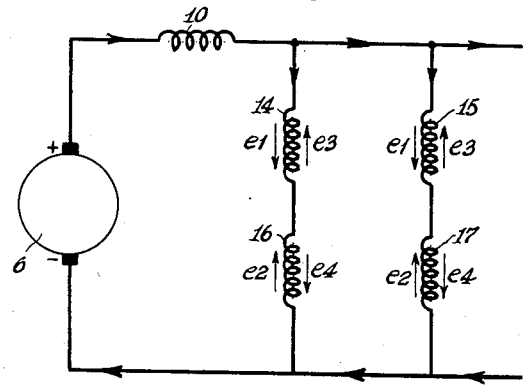
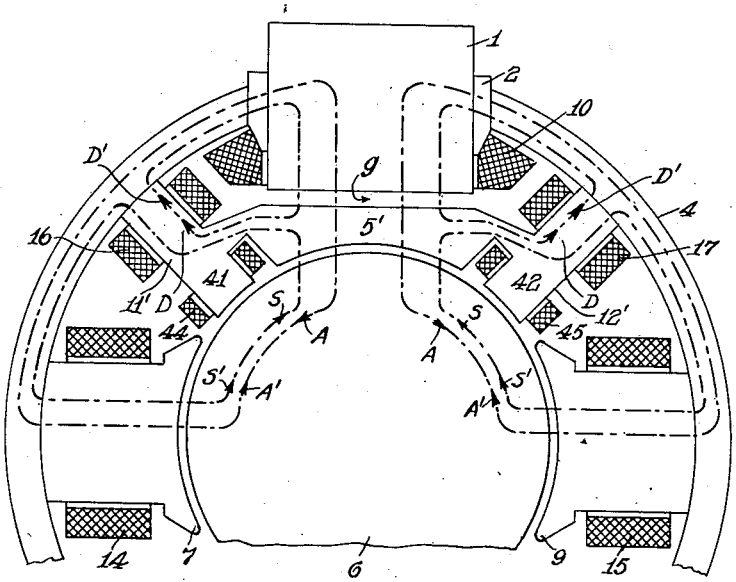

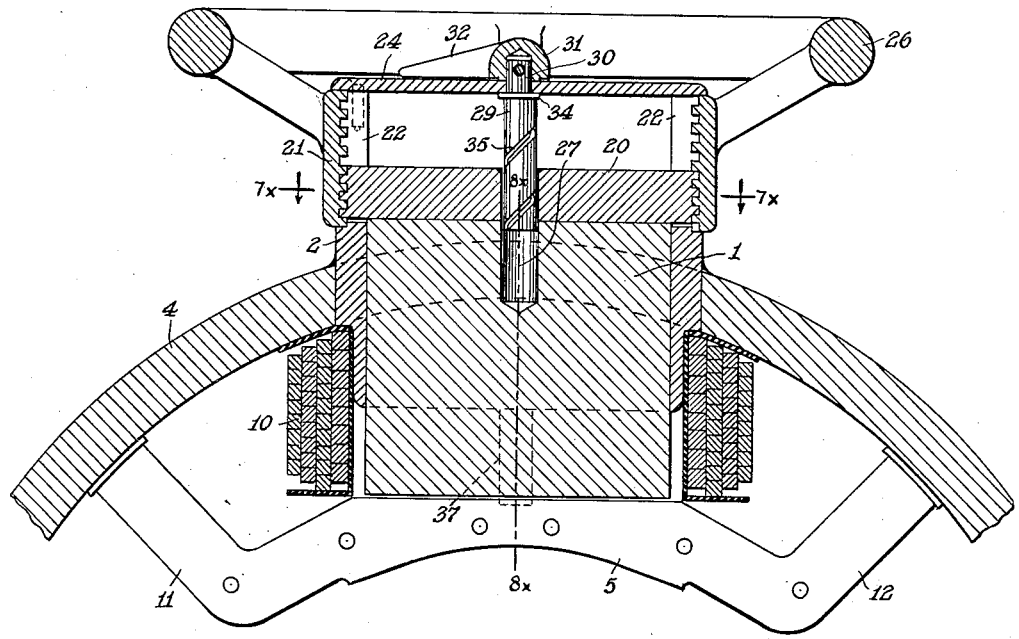
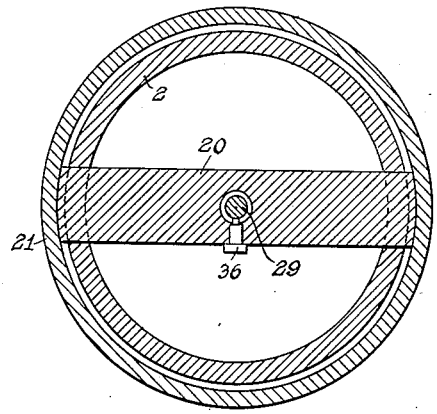
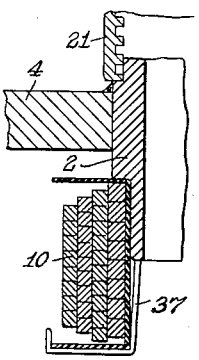

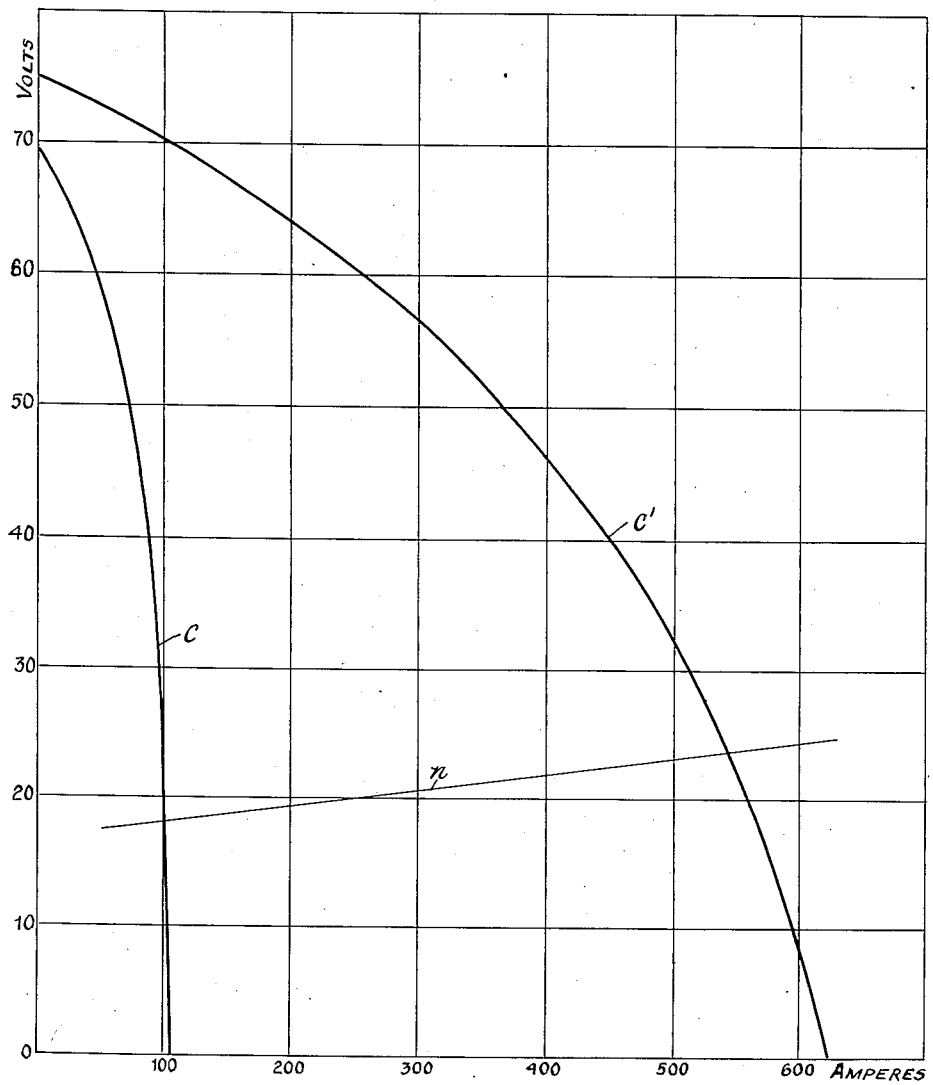

Patented June 20, 1939

2,163,417

UNITED STATES PATENT OFFICE 2,163,417

DIRECT-CURRENT GENERATOR FOR ARC WELDING

Ernest E. Tisza, Englewood, and Joseph Tyrner, Elizabeth, N. J., assignors to Air Reduction Company, Incorporated, New York, N. Y., a corporation of New York Application August 25, 1938, Serial No. 226,660

7 Claims. (Cl. 171—227)

The present invention relates generally to direct-current generators for arc-welding employing bucking series-field windings for self-regulation. In order to improve the transient characteristics of such generators, it has hitherto been the preferred practice to position such windings independently on pole elements of the field magnet frame separate from those carrying all other windings. The present invention has particular reference to generators of this character, it being the fundamental object of the invention to provide an improved means for varying their current output, whereby special advantages are obtained.

In accordance with the invention, the aforementioned object is accomplished by a field magnet frame construction involving the use of a regulating pole which is arranged for movement through a bucking series-field winding toward and away from a magnetic bridge member through which part of the flux produced by said winding is passed into the armature, the bridge member being formed at least on one side with an extension through which the remaining part of said flux is by-passed into the outer yoke of the machine. As a result of this construction, a more pronounced drooping in the external characteristic of the machine on either side of the current setting, and a more rapid recovery of the machine incident to current surges in the welding circuit, are provided. Preferably, an auxiliary shunt-field winding is carried on at least one side extension of the bridge member to produce working flux in the armature, which results in an increased current setting range, as well as an increased open-circuit voltage.

The aforementioned field magnet frame construction is especially useful in generators wherein shunt-field windings are opposed by bucking series-field windings through adjacent main pole elements of the field magnet frame. By connecting the aforementioned side extension windings of the bridge member in the opposed shunt-field winding circuits of such generators, their transient characteristics are considerably improved.

The invention may also be usefully applied to generators employing a single bucking series-field winding. In generators of this character, if the usual field magnet frame construction is employed, the use of a single regulating pole in association with the single bucking series-field winding is not ordinarily sufficient to provide the wide range of current settings required in welding operations. By making use of the improved field magnet frame construction of this invention, such range of current settings can most readily be obtained in these machines, without resort to any other means.

Figure 2:
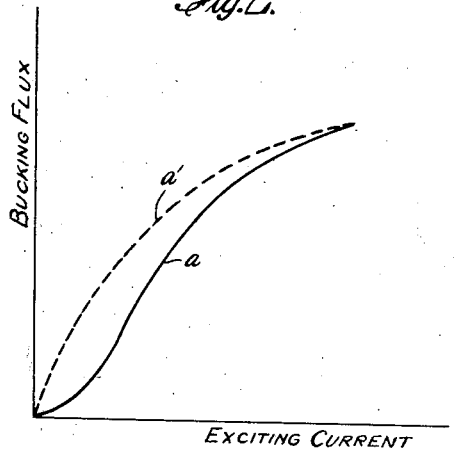
Figure 3:
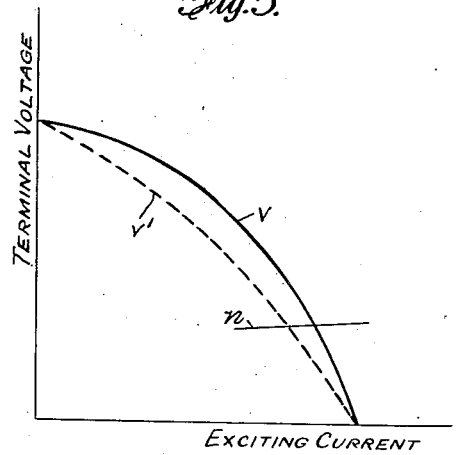

The invention will be understood from the following description taken in conjunction with the accompanying drawings in which Fig. 1 is a simplified view of a machine having a field magnet frame constructed in accordance with this invention, a portion of the machine being broken away to omit unnecessary details; Figs. 2 and 3 are curves illustrating bucking flux and terminal voltage relations with exciting current; Figs. 4 and 5 are wiring diagrams showing possible shunt field circuit connecting means; Fig. 6 is a cross-sectional view of a mechanical means for moving the regulating pole; Fig. 7 is a plan view taken on the line $7x$—$7x$ of Fig. 6; Fig. 8 is a detail view on the line $8x$—$8x$ of Fig. 6; Fig. 9 is a view similar to Fig. 1, but showing the bridge member modified to include interpole windings; and Fig. 10 is a view showing limiting characteristics that may be obtained by the invention.

Similar characters refer to similar parts throughout the various figures.

Referring to Fig. 1, the generator fragmentally illustrated therein comprises a field magnet frame having a regulating pole 1 inwardly and outwardly movable through a sleeve 2 fixed in an opening formed in the outer yoke 4. The regulating pole 1 is adapted by its movement to vary the gap $g$ formed between its lower surface and a stationary bridge member 5. The lower portion of this bridge member is formed as a pole shoe cooperating with the armature 6 in conjunction with the remaining pole elements of the field magnet frame, two of which, 7 and 9, are shown on either side of the regulating pole. Held in place on the inner end portion of the sleeve 2 is a bucking series-field winding 10. Part of the flux produced by this winding is forced through the bridge member as bucking flux A in the armature, the remaining part being diverted as flux D by extensions 11 and 12 formed on either side of the bridge member 5, which is supported by these extensions from the outer yoke.

As shown, windings 14 and 15 may be carried by the poles 7 and 9, the particular generator construction contemplating dictating the type of these windings, as well as the type of armature to be used.

Since the bucking flux A is produced through the regulating pole and bridge member, it is apparent that movement of the regulating pole operates to vary its intensity with a resulting variation in the current delivered by the generator. An outward movement of the regulating pole 1 (causing an increase in the air gap $g$) results in a decreased bucking flux A and an increased current output; while an inward movement of the pole 1 (causing a decrease in the air gap $g$) results in an increased bucking flux A and a decreased current output. Obviously, with the regulating pole in its innermost position of contact with the bridge member 5, minimum current is supplied from the generator because of maximum bucking flux produced in the armature.

As is well known in the welding art, the voltage across the arc must drop with increasing current or rise with decreasing current under normal welding conditions, for the arc cannot otherwise be satisfactorily maintained by the operator. This required voltage variation with current is particularly well provided for by the field magnet frame construction of this invention, as will now be explained.

Since the bucking field winding 10 is series-excited, the welding current obviously flows through this winding. For any position of the regulating pole, therefore, the exciting current through the winding 10 is a varying current, which is zero on open-circuit and a maximum on short-circuit. With this current variation there occurs a variation of total flux produced by the winding 10 through the regulating pole. The bucking flux A in the armature increases from zero on open-circuit to a maximum on short-circuit, but its rate of increase is affected by the flux D diverted through the side extensions 11 and 12. At the smaller values of exciting current, most of the flux produced by the winding 10 is by-passed as flux D; while at the larger values of exciting current, most of the flux produced by the winding 10 passes into the armature as flux A. As a result of the diverted flux D, therefore, the bucking flux A increases more slowly at the smaller values of exciting current, but more rapidly at the higher values of exciting current. This is clearly illustrated in Fig. 2, wherein the full line curve $a$ represents the actual variation of armature bucking flux with exciting current through the winding 10; and the dotted line $a'$ represents the corresponding variation which would normally take place if the flux D were not diverted. With this altered variation in armature bucking flux there occurs an altered variation in voltage at the terminals of the generator, this voltage decreasing more slowly at the smaller values of exciting current, but more rapidly at the higher current values of exciting current. This is illustrated in Fig. 3, wherein the full and dotted line curves $v$ and $v'$ respectively represent the terminal voltage variations corresponding to the full and dotted line curves $a$ and $a'$ of Fig. 2. The line $n$ in Fig. 3 is indicative of current and voltage values under average length of arc; from which it is apparent that the full line curve $v$ provides a more pronounced voltage variation with current than the dotted line curve $v'$, under normal welding conditions.

It is well known that the sudden resistance changes occurring in welding operations are apt to cause the generator to reflect current surges of considerable amplitude in the welding circuit. It has hitherto often been the practice to minimize such surges by the use of an external reactor. Referring to Fig. 1, the internal reactance of the generator is much increased by the side extensions 11 and 12 of the bridge member, because of which the need of an external reactor is eliminated. By the present invention, not only is the amplitude of the current surges reduced, but the time required for generator recovery incident to their occurrence is also reduced.

As shown, auxiliary windings 16 and 17 may be carried by the side extensions 11 and 12 of the bridge member, which are suitably shaped for this purpose. These auxiliary windings should be shunt-field windings connected to produce an additive flux D' in such extensions following the same paths as the flux D, distinct advantages being derived from their use. A working flux S is thus produced by the windings 16 and 17 in the armature. The open-circuit voltage of the generator is increased by this working flux, but an advantage of much greater importance is the increased range of current values permitted by the regulating pole 1. This advantage is evident from the increasing reluctance to the flux D' with increasing gap $g$, because of which more and more flux S is forced through the armature as the pole 1 is moved away from the bridge member. Therefore, the open-circuit voltage of the generator increases with increasing current which it is set to deliver by the regulating pole, which has the effect of increasing the range of current values delivered by the generator.

The windings 14 and 15 carried on the main poles 7 and 9 obviously function to produce fluxes A' and S' through the armature following the respective paths of the fluxes A and S, but this cannot in any way affect the operating factors which have been described. This is true regardless of the type of windings employed on the main poles 7 and 9. Unless the windings 14 and 15 on such poles are specially connected to assist the bucking series-field winding 10, the fluxes A' and S' which they produce are obviously working fluxes, the flux A' being opposite in direction to the bucking flux A and the flux S' of the same direction as the working flux S.

The transient characteristics of self-regulating generators for arc welding are known to be particularly affected by inductive action of their bucking series-field windings on opposed shunt-field windings having common magnetic paths through the armature, even though the inductive effects may be reduced by independent positioning of the series-field windings on pole elements carrying no other windings. Referring to Fig. 1, the bucking flux A produced in the armature by the series-field winding 10 is seen to link the windings on the main poles 7 and 9. Therefore, if the particular generator construction contemplated should require one or both of the windings 14 and 15 to be opposed shunt-field windings, there would be a certain tendency toward impaired transient characteristics of the generator, in the absence of any means counteracting this tendency. The greatly increased internal reactance provided by the field magnet frame construction illustrated in Fig. 1 is alone sufficient in all cases to reduce appreciably the inductive effects resulting from the variable character of the bucking flux A. In those cases requiring one or both of the windings on the main poles 7 and 9 to be opposed shunt-field windings, however, these inductive effects can be reduced most effectively by connecting the auxiliary field windings 16 and 17 in series circuit relation with the opposed shunt-field winding or windings on such poles, as will now be explained.

Any sudden change in current through the series-field winding 10 is accompanied simultaneously by a corresponding change in flux A through the windings 14 and 15 and by a corresponding change in flux D through the windings 16 and 17, these flux changes each constituting a flux increase or a flux decrease, depending on the nature of said exicting current change. Assuming both windings 14 and 15 to be opposed shunt-field windings, their character obviously is to produce flux A' opposite in direction to the flux A. Since on the contrary the character of the windings 16 and 17 is to produce flux D' of the same direction as the flux D, it is clear that the electromotive forces induced in these windings as a result of the change in flux D will be electrically opposite to the electromotive forces induced in the windings 14 and 15 as a result of the change in flux A, regardless of the nature of said exciting current change.

Referring to Fig. 4, the four windings 14 to 17 are all shown connected in series with one another in a shunt circuit across the generator armature 6, the winding 10 being shown in this figure merely for convenience in description, its series circuit position relative to the shunt circuit being immaterial. An increase of current through the winding 10 (causing increases in fluxes A and D) results in electromotive forces represented by the downward vectors e1 being induced in the windings 14 and 15, and electromotive forces represented by the upward vectors e2 being induced in the windings 16 and 17; while a decrease of current through the winding 10 (causing decreases in fluxes A and D) results in electromotive forces represented by the upward vectors e3 being induced in the windings 14 and 15, and electromotive forces represented by the downward vectors e4 being induced in the windings 16 and 17. In either instance, therefore, the electromotive forces induced in the windings 14 and 15 are opposed by the electromotive forces induced in the windings 16 and 17, it being apparent that the windings 14 and 15 are at least rendered less susceptible to induced current flow by their series connection with the windings 16 and 17. Obviously, the damping effect of the windings 14 and 15 on any change in the flux A is reduced, so that the response of the generator to any change of load in the welding circuit is shortened, the transient characteristics of the generator as a whole being improved. It may be noted that the windings 16 and 17 are also rendered less susceptible to induced current flow, but this is a minor advantage because of the additive character of the fluxes D and D' and their production outside the armature.

The invention is obviously not limited to the particular field circuit means illustrated in Fig. 4. As shown in Fig. 5, for example, two separate shunt-circuits each containing one of the windings 14 and 15 and one of the windings 16 and 17 may be employed and will produce the same results as those described in connection with Fig. 4. If only one of the windings 14 or 15 is an opposed shunt-field winding, it can have one or both of the windings 16 and 17 connected in its circuit. Often, either of the windings 16 or 17 can be omitted, without impairing any of the aforementioned advantages derived from the invention. The field circuit means best suited in each individual case is obviously dependent on the particular generator construction contemplated.

It is further to be understood that only one of the side extensions 11 and 12 actually needs to be employed in any case, although more pronounced advantages are obtained in most cases by use of the two extensions.

Figs. 6 and 7 illustrate a simple mechanical means which we have found particularly satisfactory in practice for moving the regulating pole 1, which is cylindrical in shape. Fixed to its upper surface is a rectangular bar 20 having arcuately-shaped threaded extremities which extend through vertical slots 22 formed in the sleeve 2 from its upper edge and are adapted for engagement with an interiorly threaded member 21. For at least the distance of the slots, the sleeve 2 is reduced in external diameter to provide a lower seat for the member 21, which is held against upward displacement on this reduced portion of the sleeve by a cover plate 24 of a diameter to extend beyond the sleeve edge, to which the plate 25 is removably secured. The member 21 is rotatable by a hand wheel 26 to raise or lower the regulating pole by vertical movement of the bar 20 in the slots 22. The regulating pole is shown in Fig. 6 in its lowermost position of contact with the bridge member 5, corresponding to which minimum current is delivered by the generator, as already explained. Contact of the bar 20 with the cover plate 25 determines the uppermost position of the regulating pole 1, corresponding to which maximum current is delivered by the generator.

Also shown in Figs. 6 and 7 is a means for indicating the various current values which the generator may be set to deliver. The regulating pole and bar 20 thereon are formed with a central opening 27, in which a stub shaft 29 rotatably supported by the cover plate 25 is adapted for inward and outward relative movement. As shown, the shaft 29 may be provided with a reduced end 30 extending through the plate 25, on which end 30 is mounted an outer hub 31 provided with a pointer 32, outward displacement of the shaft 29 being prevented by an inner collar 34. A helical groove 35 is formed in the shaft 29. As shown in Fig. 7, with this groove engages the inner end of a stud bolt 36 fitted into a side opening of the bar 20. Movement of the wheel 26 to raise or lower the regulating pole thus causes the bolt 36 to turn the shaft 29 with its attached pointer 32, which by its rotation is adapted to indicate the various current settings of the generator in conjunction with a suitable scale (not shown), the groove 35 being so designed that the maximum extent of pointer rotation in either direction is short of one complete revolution.

As shown in Fig. 6, the inner end position of the sleeve 2 is also reduced to provide more space for the winding 10. For supporting the winding 10 on this reduced sleeve portion, suitable brackets 37 fixed to its lower edge may be used, as best shown in Fig. 8.

If interpole windings are to be included in the particular generator construction contemplated, it is possible to construct the bridge member of this invention so as to carry one of such windings on each side of the regulating pole. Figure 9 illustrates this possibility. In this instance, the regulating pole 1 cooperates with a bridge member 5' provided with inner cores 41 and 42 formed integral with its side extensions 11' and 12'. The aforementioned auxiliary shunt windings 16 and 17 are carried on the outer portions of these extensions, while on the inner cores are carried interpole windings 44 and 45, which are in the usual manner connected in series with the armature. As is evident from the fact that the same magnetic paths are followed by the heretofore described fluxes produced through the armature and bridge member extensions, none of the heretofore described operating features of the invention can in any way be affected by the interpole windings 41 and 42, whose function is merely to improve commutation. The field magnet construction illustrated in Figure 9 obviously provides for more compactness in those generator constructions requiring the use of interpole windings.

As before, either one of the side extensions of the bridge member 5' can be omitted, in which case only one interpole winding would be carried by such member.

In Fig. 10 are reproduced two external characteristics C and C', which were actually obtained in practice with a machine employing the field magnet frame construction of this invention. There was only one bucking series-field winding in this machine, through which a regulating pole 1 was adapted for cooperation with a bridge member 5 provided with two side extensions 11 and 12, auxiliary shunt-field windings 16 and 17 being respectively carried by these extensions. No other current-varying means was employed. Curve C was obtained with the regulating pole in its innermost position, while curve C' was obtained with the regulating pole in its outermost position, the two curves representing the limiting characteristics of the machine.

The line $n$ in Fig. 10 thus indicates by its intersection with the two curves C and C' the minimum and maximum normal current settings of the machine. As noted, each of the two curves C and C' is characterized by considerable drooping on either side of the line $n$. It is this sharp drooping in terminal voltage on either side of the normal current setting which is especially desired in arc welding in view of the arc stability which is insured. In this respect each of the two curves C and C' is excellently suited for arc welding purposes.

Fig. 10 also shows the considerable current variation provided by the invention.

While the invention has been described in connection with a single regulating pole 1, it is understood that as many of such poles and bridge members cooperating therewith can be used as bucking series-field windings are used in the particular generator construction contemplated, each bridge member being formed with at least one side extension contacting with the outer yoke of the machine.

What is claimed is:

1. In a direct-current arc-welding generator having an armature and a bucking series-field winding, a field magnet frame construction comprising an outer yoke, a regulating pole inwardly and outwardly movable through said yoke and winding, and a bridge member formed on one side with an extension contacting with said yoke, said regulating pole being adapted for movement into and out of engagement with said bridge member through which passes into said armature part of the flux produced by said winding, the remaining part of said flux being by-passed through said extension.

2. In a direct-current arc-welding generator having an armature and a bucking series-field winding, a field magnet frame construction comprising an outer yoke, a regulating pole inwardly and outwardly movable through said yoke and winding, and a bridge member provided on both sides with extensions contacting with said yoke, said regulating pole being adapted for movement into and out of engagement with said bridge member through which passes into said armature part of the flux produced by said winding, the remaining part of said flux being by-passed through said extensions.

3. In a direct-current arc-welding generator having an armature and a bucking series-field winding, a field magnet frame construction comprising an outer yoke, a regulating pole inwardly and outwardly movable through said yoke and winding, a bridge member formed on one side with an extension contacting with said yoke, said regulating pole being adapted for movement into and out of engagement with said bridge member through which passes into said armature part of the flux produced by said winding, the remaining part of said flux being by-passed through said extension, and an auxiliary shunt-field winding on said extension producing working flux in said armature.

4. In a direct-current arc-welding generator having an armature and a bucking series-field winding, a field magnet frame construction comprising an outer yoke, a regulating pole inwardly and outwardly movable through said yoke and winding, a bridge member provided on both sides with extensions contacting with said yoke, said regulating pole being adapted for movement into and out of engagement with said bridge member through which passes into said armature part of the flux produced by said winding, the remaining part of said flux being by-passed through said extensions, and at least one of auxiliary shunt-field windings on said extensions producing working flux in said armature.

5. In a direct-current arc-welding generator having an armature, a bucking series-field winding, a pole element disposed on one side of said series-field winding, and a shunt-field winding on said pole element opposed by said series-field winding through said armature; a field magnet frame construction to include said pole element comprising an outer yoke, a regulating pole inwardly and outwardly movable through said yoke and series-field winding, a bridge member formed on one side with an extension contacting with said yoke, said regulating pole being adapted for movement into and out of engagement with said bridge member through which passes into said armature part of the flux produced by said series-field winding, the remaining part of said flux being by-passed through said extension, and an auxiliary shunt-field winding on said extension producing working flux through said armature, said auxiliary shunt-field winding being connected in series with said opposed shunt-field winding.

6. In a direct-current arc-welding generator having an armature, a bucking series-field winding, a pole element disposed on one side of said series-field winding, and a shunt-field winding on said pole element opposed by said series-field winding through said armature; a field magnet frame construction to include said pole element comprising an outer yoke, a regulating pole inwardly and outwardly movable through said yoke and series-field winding, a bridge member provided on both sides with extensions contacting with said yoke, said regulating pole being adapted for movement into and out of engagement with said bridge member through which passes into said armature part of the flux produced by said series-field winding, the remaining part of said flux being by-passed through said extensions, and an auxiliary shunt-field winding on one of said extensions producing working flux in said armature, said auxiliary shunt-field winding being connected in series with said opposed shunt-field winding.

7. In a direct-current arc-welding generator having an armature, a bucking series-field winding, pole elements disposed on either side of said series-field winding, and at least one of shunt-field windings on said pole elements opposed by said series-field winding through said armature; a field magnet frame construction to include said pole elements comprising an outer yoke, a regulating pole inwardly and outwardly movable through said yoke and series-field winding, a bridge member provided on both sides with extensions contacting with said outer yoke, said regulating pole being adapted for movement into and out of engagement with said bridge member through which passes into said armature part of the flux produced by said series-field winding, the remaining part of said flux being by-passed through said extensions, and at least one of auxiliary shunt-field windings on said extensions producing working flux in said armature, said auxiliary shunt-field windings being connected in series circuit relation with said opposed shunt-field windings.

ERNEST E. TISZA.
JOSEPH TYRNER.